United States Patent
Suumäki et al.

(10) Patent No.: US 6,857,095 B2
(45) Date of Patent: Feb. 15, 2005

(54) METHOD FOR MAKING DATA TRANSMISSION MORE EFFECTIVE AND A DATA TRANSMISSION PROTOCOL

(75) Inventors: Jan Suumäki, Tampere (FI); Ari Tourunen, Espoo (FI); Hans Kallio, Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 525 days.

(21) Appl. No.: 09/752,344

(22) Filed: Dec. 29, 2000

(65) Prior Publication Data

US 2001/0007137 A1 Jul. 5, 2001

(30) Foreign Application Priority Data

Dec. 31, 1999 (FI) ................................................ 1992837

(51) Int. Cl.[7] ............................ G08C 25/02; H04L 1/18
(52) U.S. Cl. ...................... 714/748; 714/18; 714/779; 370/352; 370/469
(58) Field of Search ................................ 370/469, 474, 370/352, 310.1, 395.6, 395.4, 395.3, 394; 714/18, 748, 749–751, 779

(56) References Cited

U.S. PATENT DOCUMENTS 6,160,804 A * 12/2000 Ahmed et al. ............... 370/349
6,359,901 B1 * 3/2002 Todd et al. ................... 370/465
6,512,747 B1 * 1/2003 Umeuchi et al. ........ 370/310.1

FOREIGN PATENT DOCUMENTS

| WO | WO 99/43133 | 8/1999 |
|----|-------------|--------|
| WO | WO 99/52307 | 10/1999 |
| WO | WO 99/66736 | 12/1999 |

* cited by examiner

Primary Examiner—Guy J. Lamarre
(74) Attorney, Agent, or Firm—Perman & Green, LLP

(57) ABSTRACT

The invention relates to a method for making data transmission more effective in a telecommunication network, which comprises layer structured protocol feature for data transmission which protocol feature comprise at least an upper layer and a lower layer, wherein the purpose of the lower layer (12) is at least to compose a data unit (6) to be transmitted to the upper layer (14) from one or more segments (9a, 9b), in which method one or more errors (5a) occurring in the received segments (1a, 1b) are detected. In the invention, said data unit (6) to be transmitted to the upper layer is composed from one or more segments (9a, 9b) containing one or more errors (5a), wherein information on the location of one or more errors (5a) is also transmitted to the upper layer (14).

12 Claims, 3 Drawing Sheets

METHOD FOR MAKING DATA TRANSMISSION MORE EFFECTIVE AND A DATA TRANSMISSION PROTOCOL

BACKGROUND OF THE INVENTION

The present invention relates to a method for making data transmission more effective in a telecommunication network, wherein the data transmission comprises layer structure protocol means for data transmission, which protocol means comprise at least an upper layer and a lower layer, wherein the purpose of the lower layer is at least to compose a data unit to be transmitted to the upper layer from one or more segments, in which method one or more errors occurring in the received is detected. The invention also relates to protocol means of a telecommunication network wherein layer structure protocol means comprise at least an upper layer and a lower layer, wherein the purpose of the lower layer is to compose a data unit to be transmitted to an upper layer from one or more contained in the received data units and to detect one or more errors occurring in the received segments. Furthermore, the invention relates to a wireless communication device comprising layer structured protocol means for data transmission, which protocol means comprise at least an upper layer and a lower layer, wherein the purpose of the lower layer is to compose a data unit to be transmitted to an upper layer from one or more segments contained in the received data units and to detect one or more errors occurring in the received segments, arranged to function in a telecommunication network.

The present invention relates to a method according to the preamble of the appended claim 1 for making data transmission more effective in a telecommunication network. The invention also relates to protocol means of a telecommunication network according to the preamble of the appended claim 11. Furthermore, the invention relates to a wireless communication device according to the preamble of the appended claim 12, arranged to function in a telecommunication network.

In the GSM network (Global System for Mobile Communications), the data transfer rate of 9.6 kbit/s is slow even according to the present standards, and in the world of a constantly growing supply of multimedia, the transfer capacity of present mobile networks is becoming insufficient. For a next generation mobile phone, mere transmission of speech is not sufficient, but the system must also be capable of handling data and and video connections. The UMTS (Universal Mobile Telecommunications System) is a global wireless multimedia system which provides wireless communication e.g. with a very fast data transfer and the user with more versatile possibilities in the form of new kinds of services. The basic requirements of the UMTS network include the capability to provide a better quality of service than in present mobile networks, a wider coverage area, a large number of additional services, as well as a larger capacity both in the transfer rate and in the number of subscriber connections than in present systems.

The UMTS network is a flexible data transmission channel which can be used to transmit speech, multimedia or other information brought into digital format. In its simplest form, the UMTS is a telephone or a portable computer which functions nearly all over the world and which has a constant fast connection to the Internet network. The UMTS has such a high data rate that it is suitable for the transmission of e.g. good quality video images.

The basic network solution of the UMTS system is based on the GSM system. The UMTS will function at a frequency of approximately 2 gigahertz, i.e. above the present DCS-1800 network (Digital Cellular System for 1800 MHz). The UMTS has the capacity for a transfer rate of 2 Mbit/s, which is approximately 200 times higher that the data transfer capacity of the GSM. This rate is sufficient for the transmission of video images of quite a good quality, and it enables the transmission of e.g. graphics and multimedia. The top rate is attained by a larger bandwidth, effective data compression and WCDMA radio technology (Wideband Code Division Multiple Access). When compared with the conventional CDMA technology (Code Division Multiple Access), the differences include larger transfer capacity, better quality, smaller power consumption as well as approximately twice as large a frequency domain. If the application to be used requires less capacity, less capacity is allocated, wherein the rest of the capacity is available for others.

An advantage of the UMTS when compared to second generation mobile phones, such as GSM subscriber connections, will be the potential transfer rate of 2 Mbit/s as well as IP support (Internet Protocol). Together these provide a possibility for a supply of multimedia services as well as new wideband services, such as video calls and video conferences.

GPRS (General Packet Radio Service) is a packet-switched data service related to the technology of the GSM network, which is especially well suited for the transmission of IP packets. New data transmission technology requires changes in the present GSM network. Two new nodes are required in the network to take care of the transmission of packets. The purpose of the nodes is to take care of the transmission and reception of the packets from a GSM telephone as well as of the conversion and transmission of packets to other, for example IP-based networks. The GPRS determines four different channel coding methods by means of which the amount of data to be transferred can be controlled in accordance with the reception of the network. The transfer capacity of one time slot varies between 9.05 kbit/s and 21.4 kbit/s, and the maximum transfer rate is approximately 164 kbit/s, when all the eight time slots are in use simultaneously. The maximum size of the packets to be transmitted is 2 kb. By means of the GPRS, it is possible to utilize the capacity of the network better, because individual time slots can be divided between several connections.

The UMTS protocol stack contains a few substantial changes when compared to the GPRS. This is because the UMTS sets considerably higher demands for the quality of service (QoS), and a new radio interface (WCDMA) is used in the UMTS. One of the most significant changes is the fact that the LLC layer (Link Control Layer) has been removed from underneath the PDCP layer (Packet Data Convergence Protocol). In the GPRS, this layer is replaced by an SNDCP layer (Subnetwork Dependent Convergence Protocol). In the UMTS, this LLC layer is not necessary, because encoding is performed in the RAN (Radio Access Network). In the transmission of signalling messages, user level protocols are not used. Furthermore, the interleaving related to the quality of service is the responsibility of a MAC layer (Medium Access Control) and an L1 layer (Layer 1=Physical Layer).

The protocol architecture of the UMTS radio interface is illustrated in FIG. 1. The architecture is implemented in a wireless communication device, such as a mobile phone, operating in a network and comprising the necessary protocol means to enable data transfer. The blocks in the drawing correspond to the manifestation of each protocol. The service access points 20 (SAP) in point-to-point connections are shown as ovals located between different sublayers in the figure. The UMTS radio interface is divided into three different protocol layers L1 (Layer 1=Physical Layer) 10, L2 (Layer 2=Data Link Layer) and L3 (Layer 3=Network Layer). The layer L2 is divided into sublayers MAC (Media Access Control) 11, RLC (Radio Link Control) 12, PDCP (Packet Data Convergence Protocol) 14 and BMC (Broadcast/Multicast Control) 13. The layer L3 is divided into a control level 17 and a user level 16. The sublayers PDCP 14 and BMC 13 are only present on the user level 16. L3 is also divided into sublayers, the lowermost of which is RRC (Radio Resource Control) 15, and it is followed by other sublayers of L3, e.g. CC (Call Control) and MM (Mobile Management), which are not shown in FIG. 1.

The purpose of the RLC protocol is to set up, maintain and set down the RLC connection. Since the upper PDCP sublayer 14 may provide longer RLC SDUs (Service Data Units) 6 (FIG. 3b) than can fit in one RLC PDU (Protocol Data Unit) 1a or 1b (FIG. 3a), the RLC SDUs 6 i.e. PDCP PDUs are divided into sections of suitable size, i.e. into PUs (Payload Unit), i.e. segments, one of which fits in each RLC PDU 1a or 1b. It is also possible that several PUs fit in one RLC PDU 1a or 1b, if compression of the header is used. Correspondingly, in the reception or at the other end of the connection, these are again combined to form one RLC SDU 6. By compressing the header, several PUs can be fitted in one RLC PDU 1a, 1b. By linking, it is possible to compose different RLC SDUs 6 in such a way that if the last PU of the first RLC SDU 6 does not fill the entire RLC PDU, 1a or 1b, the first PU of the next RLC SDU can fill the rest of this RLC PDU 1a or 1b. If linking is not utilized, and the last PU does not fill the entire RLC PDU 1a, 1b, the rest of it can be filled with padding bits. The PDU and the SDU comprise a predetermined amount of information in a predetermined form, encoded into bit format.

The user data can be transferred from one point to another using acknowledged, unacknowledged or transparent data transmission, wherein the RLC SDUs are transferred without adding RLC protocol information. Data transmission can be controlled using quality of service settings. If errors occur in the data transmission when acknowledgements are used, the errors can be corrected by retransmitting the RLC PDU. The RLC SDUs can be delivered in a reliable manner in the correct order to the receiver, when acknowledgements and sequence numbers are used. If this function is not utilized, the receiver may receive the RLC SDUs in a wrong order. It is possible that the receiver receives the same RLC PDU twice, wherein this RLC PDU is transmitted to the upper PDCP sublayer only once. The receiver can also adjust the transmission rate of the sender if it is not suitable. When the RLC PDU is received, its accuracy is checked on the basis of a checksum related to the same. If any part of the RLC PDU is defective, the entire RLC SDU related to the same is retransmitted if retransmission is available, and the set maximum number of retransmissions has not been reached. Otherwise this RLC SDU is discarded. Because errors may also occur in the function of this protocol, the aim is to find and correct these errors.

The RLC protocol provides services for the upper PDCP sublayer which include establishment and release of the RLC connection, by means of which it is possible to set up and set down RLC connections, transparent data transfer by means of which it is possible to transfer RLC SDUs without adding any RLC protocol information, but in such a way, however, that the segmentation and assembly of RLC SDU is possible, unacknowledged data transfer, by means of which it is possible to transfer information to the receiver without guaranteeing its arrival in such a way that all correct RLC SDUs are transmitted to the upper PDCP sublayer immediately only once, acknowledged data transfer, by means of which it is possible to transfer information to the receiver in a secure manner by means of retransmissions in such a way that all correct RLC SDUs that have arrived are transmitted to the upper PDCP sublayer immediately only once in the correct order or in the order of arrival, quality of service settings, by means of which it is possible to determine the quality of service which can be utilized to provide a guaranteed data transmission for the receiver in such a way that by means of retransmissions, all RLC SDUs can be transmitted to the PDCP sublayer in the transmission order correctly only once, or in the order of arrival correctly only once, notification of unrecoverable errors, by means of which it is possible to notify the PDCP sublayer that the RLC SDU cannot be transmitted since the RLC sublayer has not been able to correct the incorrect RLC PDUs within the scope of the given retransmissions and the set delay.

The main purpose of the PDCP protocol is to compress the control information related to the upper protocol layers. Another purpose of the PDCP protocol is to map the PDU of the upper layer protocol as an integer, i.e. RLC SDU, which can be understood by the RLC sublayer, to compress the redundant control information at the transmitting entity and to decompress it at the receiving entity.

Generally, sliding windows are used for flow control and recovery of error situations. In this mechanism, each sender uses a so-called transmit window with a predetermined size. Similarly, each receiver uses a so-called receive window with a predetermined size. Correctly received data blocks are acknowledged to the sender, and the window is thereby transferred forward which enables the transmission of new data blocks. In addition to this, the receiver can transmit requests for retransmission of incorrect data blocks and after they are acknowledged, the window is also "transferred". In some situations, the window "stalls" wherein the transmission of new data blocks is interrupted.

With reference to FIG. 2, the aforementioned transmit window behaves in the following way. Each packet on the left-hand side of the window has been transmitted, and an acknowledgement for the same has arrived. Inside the window, on the far left side, there is the first transmitted unacknowledged packet. Outside the window on the right-hand side there are such packets which have not been transmitted yet. Furthermore, inside the window there is a cursor which indicates the limit for packets which have been transmitted and which have not been transmitted. The cursor usually slides very fast to the far right side.

One of the most important objectives of the RLC sublayer is to provide a reliable data transfer connection, because in general, the services of the underlaying layer are not reliable, i.e. messages can be lost, or they can be corrupted. The retransmission of incorrectly received RLC PDUs is taken care of by the RLC layer of the data transfer protocol. The mechanism of the retransmission is based on the aforementioned transmit and receive windows. The size of this window is always a compromise between the used data transfer protocol and the requirements of the storage capacity available. Too small a transmit window causes stalling of the window, and interrupts the data transfer often, which considerably reduces the amount of data transferred.

In the case of UMTS, the mechanism of the retransmission is based on an automatic repeat request (ARQ), which basically functions in the following way. If the size of the receive window is one, the receiver does not accept the arriving RLC PDUs if they do not arrive in order.

Thus, if one RLC PDU is lost in the process, the receiver will discard all RLC PDUs transmitted later, before the transmit window has become full. For the receiver this method is simple, because no buffer space is required. The sender is also aware of the fact that if an acknowledgement for the RLC PDUs on the lower limit of the window does not arrive, all the RLC PDUs transmitted thereafter must be retransmitted. Thus, only one timer is sufficient for the sender, which timer is always turned on when the lowest limit of the window is transferred. When the timer is set off, a whole window of RLC PDUs will be retransmitted.

On the other hand, if the size of the receive window is larger than one, the loss of one frame does not necessarily require retransmission of the following frames. If they are accurate when they are received by the receiver, the receiver has buffered those frames which fit in the receive window. A frame which is lost or contains errors when it arrives, remains on the lowest limit of the receive window, and the receive window will not be transferred until the missing frame is received.

FIG. 2 illustrates the above-described retransmission mechanism using an example in which the size of the transmit and receive window is 4. The example is examined in chronological order, first from the point of view of the sender and then from the point of view of the receiver. In the example, the RLC PDUs 1a and 1b to be transmitted are indicated with reference DATA (x), in which x is the sequence number of the RLC PDU. Correspondingly, the acknowledgements are indicated with reference ACK (x) in which x is the sequence number of the RLC PDU to be acknowledged.

The sender transmits DATA (0), wherein the transmit window is [0,1,2,3]. Next, the sender transmits DATA (1) in a corresponding manner. Now, the sender receives an acknowledgement ACK (0), wherein the transmit window is now [1, 2, 3, 4]. The sender transmits DATA (2). Now, the sender receives an acknowledgement ACK (1), wherein the transmit window is now [2, 3, 4, 5]. The sender is not aware of the fact that DATA (2) never reaches its destination, and thus the process continues with the transmission of DATA (3) and DATA (4). The transmit window is still [2, 3, 4, 5], because DATA (2) has not arrived. Now the timer of DATA (2) is set off, wherein the transmission is started from the beginning of the transmit window, i.e. by the transmission of DATA (2). Thereafter, the sender waits until an acknowledgement is received, or until the next timer is set off. In this situation, it is not advantageous for the sender to retransmit the next packets. Usually, it is reasonable to wait to see whether a notification arrives in the next acknowledgement which indicates that the entire window or at least a part of it has been received correctly. In this case, the acknowledgement ACK (4) has time to arrive before the timer of DATA (3) is set off, and thus the transmit window is [5, 6, 7, 8]. Now the sender can transmit DATA (5). Thereafter the process continues in the above-described manner.

When the receiver receives DATA (0), the receive window is [1, 2, 3, 4]. Thereafter, the receiver transmits an acknowledgement ACK (0). Now, the receiver receives DATA (1), and thus the receive window is [2, 3, 4, 5]. An acknowledgement ACK (1) is transmitted to the sender. Thereafter the receiver receives DATA (3) instead of the expected DATA (2), and therefore the receive window is not transferred, and DATA (3) is buffered. The receiver is still waiting for DATA (2), but receives DATA (4) instead, and therefore the receive window is not transferred, and DATA (4) is buffered. Next, the receiver receives the expected DATA (2) and the buffer contains DATA (3) and DATA (4), and thus the receive window is now [5, 6, 7, 8]. Since packets have now been received as far as DATA (4), it is possible to transmit an acknowledgement ACK (4) to the sender. Thereafter, the receiver receives DATA (5), and thus the receive window is now [6, 7, 8, 9]. Thereafter the process continues in the above-described manner.

Each RLC PDU contains a checksum by means of which it is possible to check that the RLC PDU does not contain any errors. More precisely, in the UMTS, the checksum is added and checked in the L1 layer, but in view of the logical operation, this resembles a feature of the RLC protocol. This, however, results in that the data block protected by the checksum also contains the header information of the RLC, and possibly also the header information of MAC protocol. Normally, when acknowledgements are used, incorrect RLC PDUs are transmitted again and again until they arrive accurately, or until the set maximum number of retransmissions is full. When all RLC PDUs of RLC SDU have been transmitted accurately to the receiver, the RLC SDUs can be composed and transmitted to an upper PDCP sublayer. If acknowledgements are not used, the accuracy of all RLC PDUs of RLC SDU is checked. If an RLC PDU is incorrect, the entire RLC SDU is discarded.

Because of the wireless environment, the UMTS has a limited bandwidth and a larger error probability and longer delays when compared to a fixed network. Real-time applications, in turn, require as small delays as possible. When packets containing one single error are discarded and retransmitted, it is probable that there will be situations in which there is no time to transmit the packet accurately before it is too late.

SUMMARY OF THE INVENTION

It is a purpose of the present invention to produce a data transmission connection with small delays between two points, which is suitable for real-time applications and which allows the transmission of slightly corrupted data to the application. Furthermore, it is an aim of the invention to improve the quality of real-time data transmission.

According to the invention, these objectives can be attained in such a manner that all erroneous RLC SDUs are not automatically discarded. The RLC PDUs are always transmitted as RLC SDU to the PDCP sublayer, but if errors are detected in RLC PDUs, information on the location of the erroneous point in the RLC SDU is transmitted to the PDCP sublayer in addition to the composed RLC SDU. On the basis of this information, the PDCP sublayer can also discard the RLC SDU if necessary, if the error is located for example by the control information of the upper protocol layers.

More precisely, the method according to the invention is characterized in that a data unit to be transmitted to the upper layer is composed from one or more segments which contain one or more errors, wherein information on the location of one or more errors is also transmitted to the upper layer. The protocol means according to the invention are characterized in that to make data transmission more effective, the purpose of the lower layer is also to compose the data unit to be transmitted to the upper layer from one or more segments containing one or more errors, and also to transmit information concerning the location of said one or more errors to the upper layer. The wireless communication device according to the invention is characterized in that to make data transmission more effective, the purpose of the lower layer is also to compose the data unit to be transmitted to the upper layer from one or more segments containing one or more errors, and also to transmit information concerning the location of the one or more errors to the upper layer.

With the present invention, considerable advantages are attained when compared to solutions according to prior art. When the RLC sublayer is capable of accepting RLC PDUs containing erroneous payload and composing them into RLC SDU, the number of discarded RLC PDUs is considerably reduced. Thus, the probability of a situation that an RLC SDU is not transmitted in time to the upper sublayer is considerably reduced. Furthermore, the payload can be successfully transferred in real time also via poor connections. Here, it should be noted that in connection with real-time services, unacknowledged data transmission is usually used. Thus, the RLC SDUs become easily discarded because the RLC PDUs can be easily corrupted and their retransmission is not even attempted. Thus, the present invention provides a possibility not to discard the SDU, but to make an attempt to utilize erroneous payload data instead.

BRIEF DESCRIPTION OF THE DRAWING

In the following, the invention will be described in more detail with reference to the appended drawings, in which.

DETAILED DESCRIPTION OF THE INVENTION

Real-time data transmission sets great demands on the delay, and thus it is not always possible to retransmit all erroneous packets (RLC PDU) within the scope of the allowed delay in such a manner that a completely error-free RLC SDU could be composed. Therefore, in most cases it is more advantageous that in real-time data transmission also the erroneous RLC SDUs are transmitted to the upper sublayer with the error information. According to prior art, the PDCP sublayer is not capable of determining where the error is located. In other words, it is possible that the error is located at the header information of the PDCP or upper protocol layers, such as TCP/IP, which header information can also be compressed. This error in the header can cause serious problems in the upper sublayers. Therefore, it is extremely important that the header information be completely accurate. Most real-time applications function reasonably well in a situation in which the payload is slightly erroneous when compared to a situation where an entire packet is missing therebetween. Therefore, it is extremely useful to know where the possible errors are located in the received RLC SDU.

For example, when a video image is desired to be transmitted in real time via a data transmission connection, a slightly erroneous payload does not affect the quality of the video image to be transmitted to a large degree. It is likely that an error cannot even be detected in the video image by the viewer. On the other hand, if a packet cannot be transmitted to the application because it has not been accurately transmitted sufficiently early, great distortions may occur in the video image as well as an interruption in its transmission. This may disturb the user considerably more than almost invisible changes in the video image. Similarly, when sound is reproduced, it is unlikely that small errors can be heard, but if a frame is missing, a break may occur in the reproduction of sound, or the sound is distorted considerably more than in a situation where the payload contains a single error. Furthermore, many real-time applications are capable of correcting errors to some extent, in such a way that the error can be even imperceptible to the user. Naturally, if the data transmission connection is very poor, erroneous RLC SDUs have to be discarded often. Thus, the image or sound that is reproduced is inevitably of poorer quality than in a situation where a good data transmission connection is available.

Figure 3A:
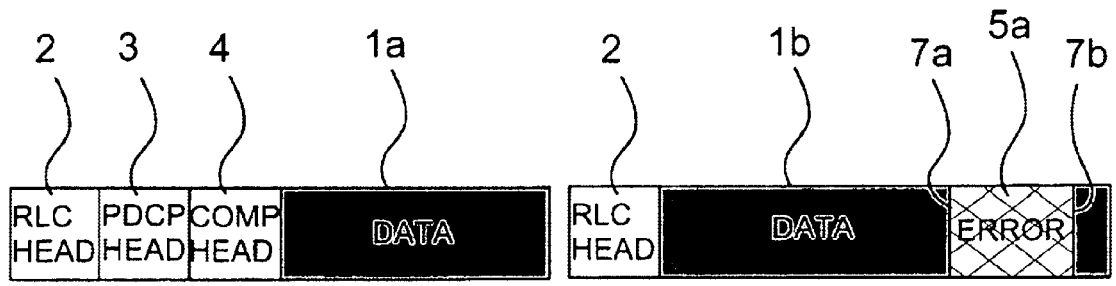
FIG. 3a illustrates a situation in which one RLC SDU is divided into two segments, and one segment contains an erroneous point.
Figure 3B:
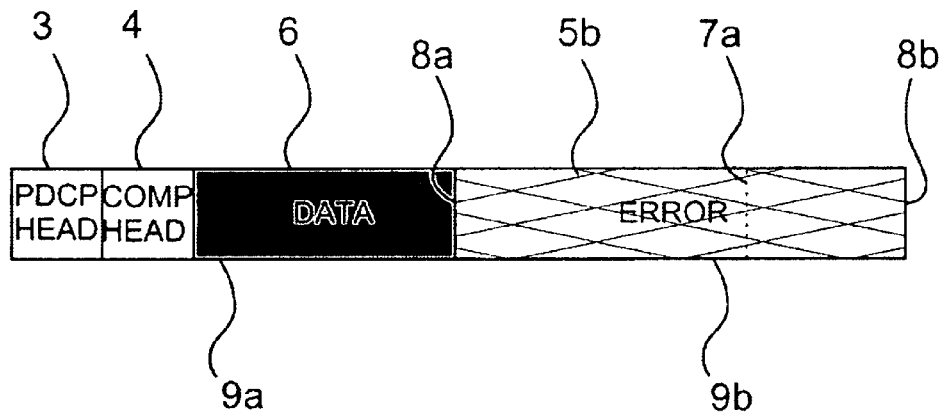
FIG. 3b illustrates the RLC SDU of FIG. 3a, which is transmitted to a PDCP sublayer, and a manner according to a preferred embodiment of the invention for presenting the erroneous point on this PDCP sublayer.
Figure 3C:
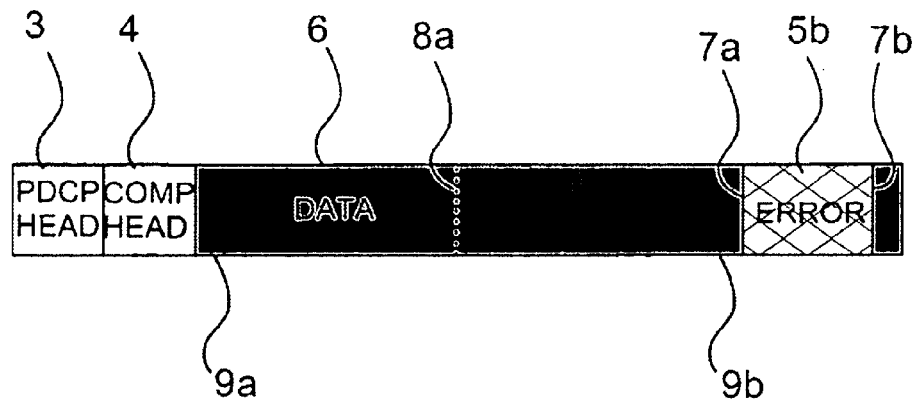
FIG. 3c illustrates the RLC SDU of FIG. 3a which is transmitted to the PDCP sublayer, and another manner according to a preferred embodiment of the invention for presenting the erroneous point in this PDCP sublayer.

With reference to FIGS. 3a to 3c, the accuracy of the data is checked for each RLC PDU, and thus an erroneous area 5a can be detected with the accuracy of one segment 9a, 9b (RLC PDU 1a, 1b without the RLC head 2). It is also possible to utilize a method by means of which the erroneous area 5a can be detected accurately, i.e., it is possible to determine the point where the error begins 7a and where it ends 7b. The error can also be the missing RLC PDU, wherein in the RLC SDU 6 to be coded, the entire point of the segment containing the missing RLC PDU constitutes the erroneous area 5a. If there is an error in the RLC header of a RLC PDU, this RLC PDU has to be discarded. Thus, in the RLC SDU this segment contained in the RLC PDU has to be marked as an erroneous area, if this RLC PDU cannot be retransmitted.

The first case is shown in FIGS. 3a and 3b. When in this case all erroneous RLC PDUs 1a, 1b have not yet been retransmitted in such a way that all RLC PDUs 1a, 1b belonging to the RLC SDU would have been received completely accurately, a RLC SDU 6 containing at least one erroneous point has to be transmitted to the upper PDCP sublayer 14. In addition, information on the error or errors 5a is transmitted to the upper PDCP sublayer. There are two alternatives for this. The first alternative is that the number of that segment 9a, 9b in which this error 5a is located is transmitted to the upper sublayer. In this case the PDCP sublayer has to be aware of the exact size of the segment 9a, 9b. Alternatively, the RLC sublayer can transmit the starting point 8a and the end 8b of the erroneous segment to the PDCP sublayer. On the basis of the transmitted error information, the PDCP sublayer knows that the error is located inside a particular segment, i.e. the entire area 5b between the starting point 8a and the end 8b of the segment is presented to be erroneous in the PDCP sublayer. This results in that if the error 5a occurs in the segment 9a, 9b containing control information of the PDCP header and/or upper protocol layers 4, the entire RLC SDU 6 has to be discarded.

Another case is shown in FIGS. 3a and 3c. In this case it is possible to transmit information to the upper sublayer to indicate the exact location of the error 5a in the RLC SDU. Now, the location of those bits in the RLC SDU from which the error 5a starts 7a and where the error 5a ends 7b is transmitted to the PDCP sublayer. In this case the PDCP sublayer knows, on the basis of the transmitted error information, the exact location 5b of the error, i.e. the location of the error 5a as well as the location 5b of the error seen by the PDCP sublayer are the same. Thus, it is not necessary for the PDCP sublayer to know anything about the segmentation of the RLC sublayer. To implement this mechanism, the RLC sublayer has to be capable of efficiently calculating a checksum, on the basis of which it is possible to find the erroneous areas 5a accurately. Naturally, it is possible that the RLC sublayer is capable of detecting the errors 5a with the accuracy of predetermined areas, the length of which can be e.g. ⅛ of the length of the RLC SDU. Now, it is possible that the error 5a is in the segment 9a, 9b containing control information 4 of the PDCP header and/or upper protocol layers, but the RLC SDU 6 does not necessarily have to be discarded as long as the area 5b which is marked erroneous is not located by the PDCP header 4.

Figure 1:
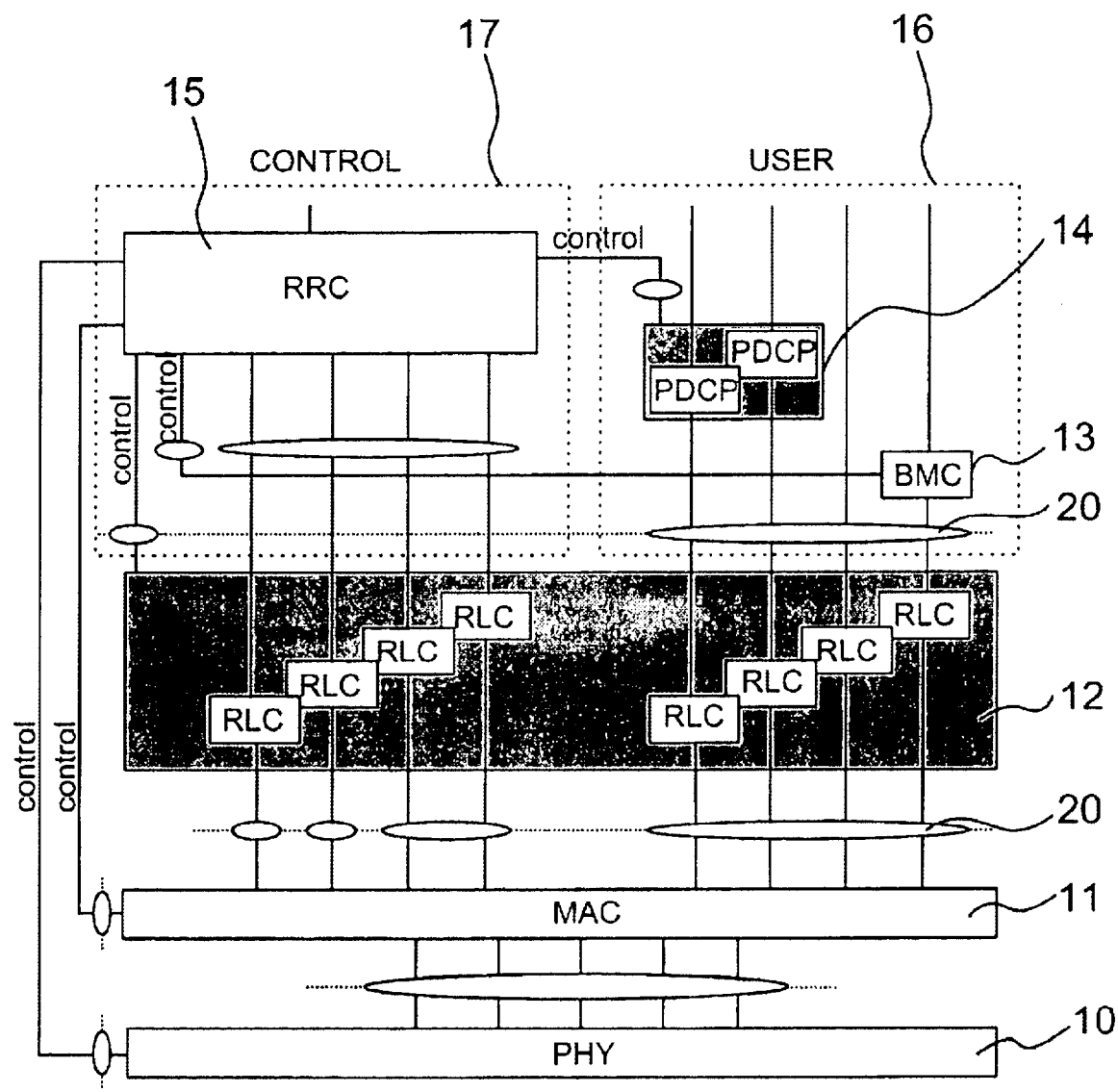
FIG. 1 shows the lowest layers in the UMTS protocol stack.
Figure 2:
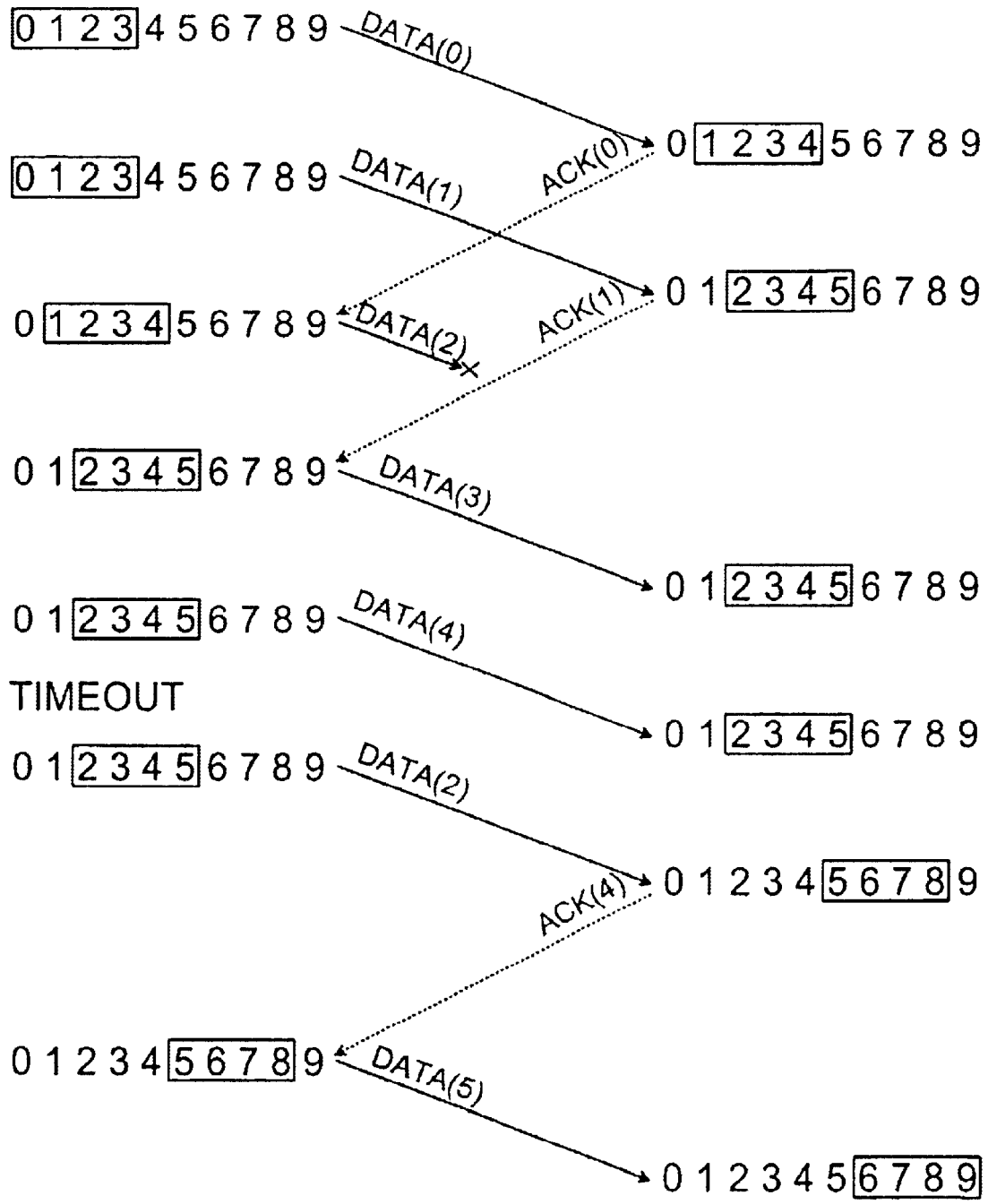
FIG. 2 shows an example of a retransmission method utilizing automatic repeat request.

With reference to FIG. 1, the RLC SDU 6 (FIGS. 3a to 3c) received and composed from the RLC sublayer 12, is transmitted via the RLC PDCP interface to the PDCP sublayer 14 by a primitive RLC-AM-DATA-Ind, RLC-UM-DATA-Ind or RLC-TR-DATA-Ind. The same primitive can also be used for transmission of error information from the RLC sublayer 12 to the PDCP sublayer 14. The following table presents the primitives between the RLC sublayer 12 and the PDCP sublayer 14. The error information to be transmitted to the PDCP sublayer 14 can be ESI (Error Segment Indication) mentioned in the table. ESI can be for example the sequence number of the segment 9a, 9b containing the error, or the number of the bits in the beginning of the RLC SDU 6 from which the erroneous area 5b begins, and the length of this area in bits.

In the following, the function of different primitives is also described:

RLC-AM-DATA-Req: by means of this primitive the PDCP sublayer 14 requests for acknowledged data transmission from the RLC sublayer 12, RLC-AM-DATA-Ind: by means of this primitive the RLC sublayer 12 transmits error information (ESI) and RLC SDUs 6 of the PDCP sublayer 14 which are transferred using acknowledgements, RLC-AM-DATA-Conf: by means of this primitive the RLC sublayer 12 confirms the transmission of RLC SDU 6 to PDCP sublayer 14, RLC-UM-DATA-Req: by means of this primitive the PDCP sublayer 14 requests unacknowledged data transmission from RLC sublayer 12

RLC-UM-DATA-Ind: by means of this primitive the RLC sublayer 12 transmits error information (ESI) and RLC SDUs 6 of the PDCP sublayer 14, which are transmitted without acknowledgements, RLC-TR-DATA-Req: by means of this primitive the PDCP sublayer 14 requests the RLC sublayer 12 for transparent data transmission, RLC-TR-DATA-Ind: by means of this primitive the RLC sublayer 12 transmits error information (ESI) and RLC SDUs 6 of the PDCP sublayer 14, which are transferred using transparent data transmission.

| | Parameter | | | |
|---|---|---|---|---|
| General name | Req. | Ind. | Resp. | Conf. |
| RLC-AM-DATA | Data, CFN, MUI | Data, ESI | Undefined | MUI |
| RLC-UM-DATA | Data, | Data, ESI | Undefined | Undefined |
| RLC-TR-DATA | Data | Data, ESI | Undefined | Undefined |

Because the PDCP sublayer 14 contains the error information provided by the RLC sublayer 12, the PDCP sublayer 14 can decide what is to be done for the erroneous PDCP SDUs 6. The decision is made on the basis of the point where the error occurs in the SDU. For example, if the error occurs in the initial part of the PDCP SDU, i.e. in the control information 4 of upper protocol layers, it is likely that the header cannot be decompressed, and thus it is not advantageous to transmit the PDCP SDU to an upper layer. Thus, it is advantageous to discard this PDCP SDU. For example, if the error occurs in the payload, the PDCP SDU can be transmitted to the upper layer.

The present invention is not restricted solely to the embodiments presented above, but it can be modified within the scope of the appended claims.

What is claimed is:

1. A method for making data transmission in a telecommunication network more effective, which comprises layer structure protocol means for data transmission, which protocol means comprise at least an upper layer and a lower layer, wherein the purpose of the lower layer (12) is at least to compose a data unit (6) to be transmitted to the upper layer (14) from one or more segments (9a, 9b), in which method:

one or more errors (5a) occurring in the received segments 1a, 1b) is detected, wherein said data unit (6) to be transmitted to the upper layer is composed from one or more segments (9a, 9b) which contain one or more errors (5a), and wherein information on the location of one or more errors (5a) is also transmitted to the upper layer (14).

2. The method according to claim 1, in which it is also detected that an entire data unit (1a, 1b) to be received is missing, wherein the location of the segment (9a, 9b) of said missing data unit (1a, 1b) in the data unit (6) to be composed is interpreted as an erroneous area (5a).

3. The method according to claim 1, in which the erroneous data units (1a, 1b) are corrected in the lower layer (12) within a determined delay using acknowledgements and retransmissions, wherein in the lower layer (12) the data unit (6) to be transmitted to the upper layer (14) is composed from segments (9a, 9b) located in the received data units (1a, 1b) after all data units (1a, 1b) are received accurately, or when within a given delay there is not enough time to correct the erroneous or missing data units (1a, 1b) by means of retransmission.

4. The method according to claim 1, in which the size of the segment (9a, 9b) located in the received data unit is determined in the upper layer (14), wherein said error information to be transmitted to the upper layer (14) comprises the sequence number of the segments (9a, 9b) located in the received data unit (1a, 1b) and containing the error (5a), and wherein in the upper layer (14) the areas (5b) containing the errors (5a) are calculated on the basis of the error information and the size of said segment (9a, 9b).

5. The method according to claim 4, wherein said segment (9a, 9b) also contains at least control information (4) of the upper protocol layer or a header (3), and wherein the composed data unit (6) is discarded when the error (5a) is located at least partly in such a section of thee composed data unit (6) which contains control information (4) of the upper protocol layer or a header (3).

6. The method according to claim 1, in which the starting point (5a) and the end (8b) of the segments (9a, 9b) located in the received data units and containing one or more errors are determined in the upper layer (14), wherein said error information to be transmitted to the upper layer (14) contains the sequence number of those segments (9a, 9b) located in the received data units (1a, 1b) in which the error (5a) is located, and wherein the areas (5b) within which the errors (5a) are located are calculated in the upper layer (14) on the basis of error information and the starting point (8a) and the end (8b) of said segment (9a, 9b).

7. The method according to claim 1 in which the starting point (7a) and the end (7b) of the error are determined in the lower layer (12), wherein said error information to be transmitted to the upper layer (14) comprises the starting point (7a) and the end (7b) of the error (Sa) of the composed data unit (6).

8. The method according to claim 7, wherein the segment (9a, 9b) also comprises at least control information (4) of an upper protocol layer or a header (3), and wherein the composed data unit (6) is discarded when the error (5a) is located at least partly in such a section of at least partly composed data unit (6) which contains control information (4) of an upper protocol layer or a header (3).

9. The method according to claim 1, wherein said lower layer is an RLC layer and said upper layer is a PDCP layer.

10. The method according to claim 1, wherein said received data unit is an RLC PDU unit and said composed data unit is an RLC SDU unit.

11. Protocol means of a telecommunication network for data transmission, which layer structure protocol means comprise at least an upper layer and a lower layer, wherein the purpose of the lower layer (12) is to compose a data unit (6) to be transmitted to an upper layer (14) from one or more segments (9a, 9b) contained in the received data units (1a, 1b) and to detect one or more errors (Sa) occurring in the received segments (1a, 1b), and wherein to make data transmission more effective, the purpose of said lower layer (12) is also to compose the data unit (6) to be transmitted to the upper layer from one or more segments (9a, 9b) containing one or more errors (Sa), and also to transmit information concerning the location of said one or more errors (Sa) to the upper layer (14).

12. A wireless terminal arranged to function in a telecommunication network and comprising layer structured protocol means for data transmission, which protocol means comprise at least an upper layer and a lower layer, wherein the purpose of the lower layer (12) is to compose a data unit (6) to be transmitted to an upper layer (14) from one or more segments (9a, 9b) contained in the received data units (1a, 1b) and to detect one or more errors (5a) occurring in the received segments (1a, 1b), and wherein to make data transmission more effective, the purpose of said lower layer (12) is also to compose the data unit (6) to be transmitted to the upper layer from one or more segments (9a, 9b) containing one or more errors (5a), and also to transmit information concerning the location of said one or more errors (5a) to the upper layer (14).

* * * * *